United States Patent
Nishita et al.

(10) Patent No.: US 10,591,290 B2
(45) Date of Patent: Mar. 17, 2020

(54) SURVEY SYSTEM

(71) Applicant: TOPCON CORPORATION, Tokyo (JP)

(72) Inventors: Nobuyuki Nishita, Tokyo (JP); Kenichiro Yoshino, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 372 days.

(21) Appl. No.: 15/619,079

(22) Filed: Jun. 9, 2017

(65) Prior Publication Data

US 2017/0356741 A1   Dec. 14, 2017

(30) Foreign Application Priority Data

Jun. 14, 2016 (JP) ................. 2016-117721

(51) Int. Cl.
| | | |
|---|---|---|
| *G01C 3/08* | (2006.01) | |
| *G01C 3/04* | (2006.01) | |
| *G01S 17/89* | (2020.01) | |
| *G01C 15/00* | (2006.01) | |
| *G01S 17/87* | (2020.01) | |
| *G01S 17/42* | (2006.01) | |
| *G01S 17/66* | (2006.01) | |

(52) U.S. Cl.
CPC ............ *G01C 3/04* (2013.01); *G01C 15/002* (2013.01); *G01S 17/42* (2013.01); *G01S 17/66* (2013.01); *G01S 17/87* (2013.01); *G01S 17/89* (2013.01)

(58) Field of Classification Search
CPC ......... G01C 3/04; G01C 15/002; G01S 17/89; G01S 17/66; G01S 17/87; G01S 17/42
USPC ........................................... 356/4.01
See application file for complete search history.

(56) References Cited

U.S. PATENT DOCUMENTS

| | | | |
|---|---|---|---|
| 8,045,762 B2 | 10/2011 | Otani et al. | |
| 10,162,353 B2 * | 12/2018 | Hammond | .............. G01S 17/66 |
| 2015/0241204 A1 | 8/2015 | Steffey et al. | |

FOREIGN PATENT DOCUMENTS

| | | | | |
|---|---|---|---|---|
| EP | 2103905 A2 * | 9/2009 | .......... | G01C 15/004 |
| EP | 2105706 A2 | 9/2009 | | |
| EP | 2889576 A1 | 7/2015 | | |
| JP | 5057734 B2 | 10/2012 | | |

* cited by examiner

*Primary Examiner* — Mark Hellner
(74) *Attorney, Agent, or Firm* — Roberts Calderon Safran & Cole P.C.

(57) ABSTRACT

Provided is a survey system capable of acquiring point group data of a three-dimensional object desired to be measured without complicated setting. A survey system includes a surveying instrument including a tracking section that tracks a target by emitting tracking light and receiving the tracking light reflected on the target, and a scanner that rotates horizontally and integrally with the surveying instrument and performs scanning around a single axis in a vertical direction, and the scanner and the tracking section are offset in the horizontal direction. Therefore, a scanning line (SL) does not match the target, and is always controlled around the target.

7 Claims, 5 Drawing Sheets

SURVEY SYSTEM

TECHNICAL FIELD

The present invention relates to a survey system that acquires three-dimensional data of a survey site.

BACKGROUND OF THE INVENTION

In recent years, a three-dimensional survey of a three-dimensional object is frequently conducted, and demand for images with three-dimensional data of a three-dimensional object has increased. Therefore, at a survey site, by using a laser scanner, a pulsed laser is scanned on a predetermined measurement area and distance measuring is performed for three-dimensional position data of an irradiation point of the pulsed laser to acquire point group data of the measurement area (for example, refer to Patent Literature 1).

RELATED ART

Patent Literature 1: Japanese Patent No. 5057734

SUMMARY OF THE INVENTION

Technical Problem

However, with a conventional laser scanner, in order to sufficiently obtain point group data of a three-dimensional object desired to be measured, it is necessary to preferably set a measurement area, and in particular, when it is desired to obtain detailed point group data, more accurate setting is necessary.

An object of the present invention is to provide a survey system capable of acquiring point group data of a three-dimensional object desired to be measured without complicated setting.

Solution to the Problem

In order to solve the above-described problem, a survey system according to an embodiment of the present invention includes a surveying instrument having a tracking section that tracks a target by emitting tracking light and receiving the tracking light reflected on the target, and a scanner that rotates horizontally and integrally with the surveying instrument and performs scanning around a single axis in a vertical direction, wherein the scanner and the tracking section are offset in a horizontal direction.

In the embodiment described above, it is also preferable that an optical axis of the scanner is on a horizontal rotary shaft of the surveying instrument, and is offset by a fixed angle θ in the horizontal direction from an optical axis of the tracking light.

In the embodiment described above, it is also preferable that an optical axis of the scanner is not on a horizontal rotary shaft of the surveying instrument, and is offset by a distance d in the horizontal direction with respect to an optical axis of the tracking section.

In the embodiment described above, it is also preferable that the surveying instrument further includes a measurement section that performs distance measuring and angle measuring to the target by emitting a distance measuring light and receiving the distance measuring light reflected on the target, an optical axis of the scanner is on a horizontal rotary shaft of the surveying instrument, the tracking section includes a tracking light transmitting section and a tracking light receiving section, performs tracking so that an image of reflected light of the tracking light is always located at a predetermined position on an image of the tracking light receiving section, and detects an image of reflected light of the scanner at a position offset at least in the horizontal direction from the predetermined position on an image of the tracking light receiving section.

In the embodiment described above, it is also preferable that the survey system does not acquire anything except for point group data near a measured elevation angle of the target.

Advantageous Effects of Invention

With the survey system according to the present invention, point group data of a three-dimensional object desired to be measured can be acquired without complicated setting.

DETAILED DESCRIPTION OF THE PREFERRED EMBODIMENTS

Next, preferred embodiments of the present invention are described with reference to the drawings.

First Embodiment

Figure 1:
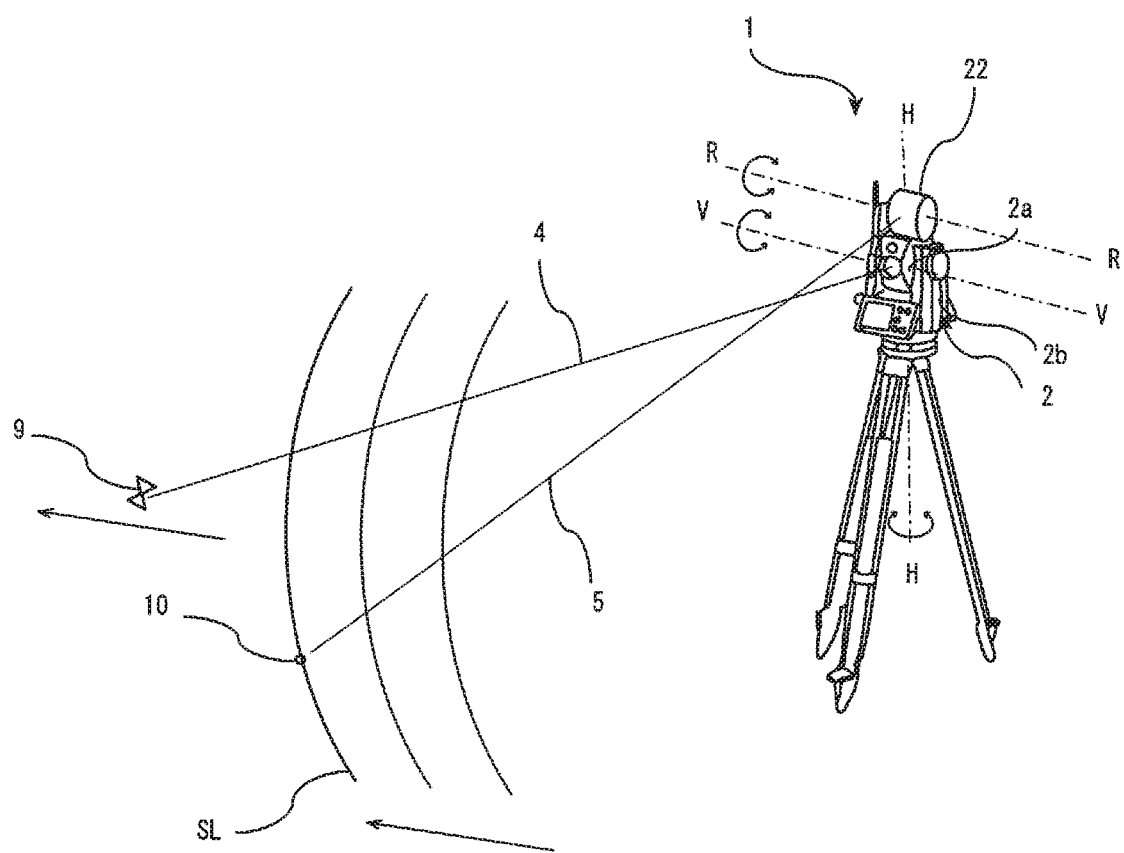
FIG. 1 is an external perspective view of a survey system according to a first embodiment.

FIG. 1 is an external perspective view of a survey system according to a first embodiment. The reference sign 1 in FIG. 1 denotes a survey system according to the present embodiment. The survey system 1 includes a surveying instrument 2 and a scanner 22 in appearance. The reference sign 9 denotes a prism as a target of the surveying instrument 2.

Figure 2:
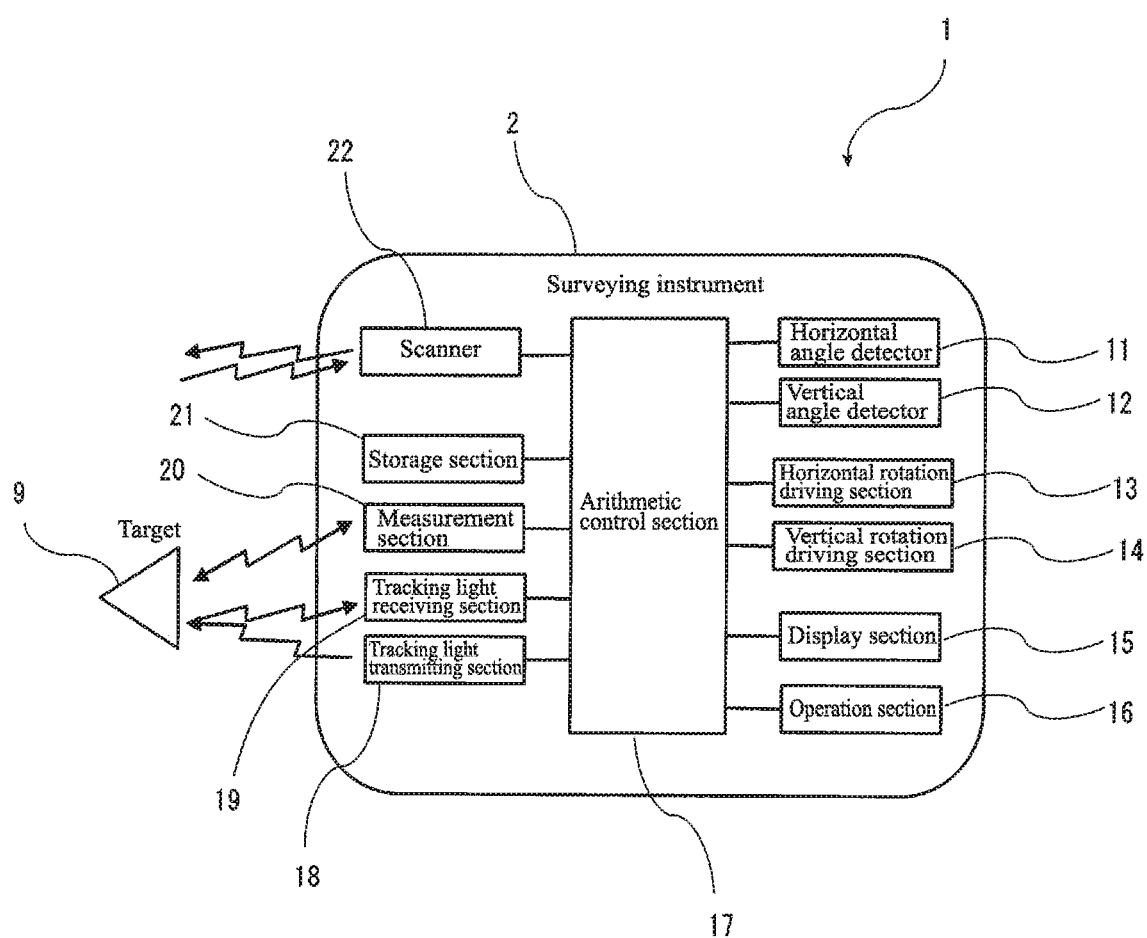
FIG. 2 is a block diagram of a configuration of the survey system according to the first embodiment.

FIG. 2 is a control block diagram of the survey system 1. The survey system 1 includes a horizontal angle detector 11, a vertical angle detector 12, a horizontal rotation driving section 13, a vertical rotation driving section 14, a display section 15, an operation section 16, an arithmetic control section 17, a tracking light transmitting section 18, a tracking light receiving section 19, a measurement section 20, a storage section 21, and a scanner 22.

The horizontal angle detector 11, the vertical angle detector 12, the horizontal rotation driving section 13, the vertical rotation driving section 14, the arithmetic control section 17, and the storage section 21 are housed in a bracket portion 2b (described below) of the surveying instrument 2, and the display section 15 and the operation section 16 are provided outside the bracket portion 2b. The tracking light transmitting section 18, the tracking light receiving section 19, and the measurement section 20 are housed in a telescope 2a (described below) of the surveying instrument 2. The scanner 22 is fixed to the telescope 2a so as to be disposed as described below.

The surveying instrument 2 is a so-called motor drive total station, and installed at a known point by using a tripod. The surveying instrument 2 includes, in order from the lower side, a leveling section, a base portion provided on the leveling section, the bracket portion 2b that rotates around a horizontal rotary shaft H-H on the base portion, and the telescope 2a that rotates around a vertical rotary shaft V-V at the center of the bracket portion 2b.

The horizontal rotation driving section 13 and the vertical rotation driving section 14 are motors, and are controlled by the arithmetic control section 17 and respectively drive the horizontal rotary shaft H-H and the vertical rotary shaft V-V. In the surveying instrument 2, by collaboration of horizontal rotation of the bracket portion 2b and vertical rotation of the telescope 2a, distance measuring light or tracking light is emitted from the telescope 2a.

The display section 15 and the operation section 16 are interfaces of the survey system 1, and by these sections, commanding and setting of a survey operation and confirmation of operation status and measurement results can be performed.

Each of the horizontal angle detector 11 and the vertical angle detector 12 is an absolute encoder or an incremental encoder including a rotary disk, a slit, a light emitting diode, and an image sensor. The horizontal angle detector 11 is provided with respect to the horizontal rotary shaft H-H and detects a rotation angle in the horizontal direction of the bracket portion 2b. The vertical angle detector 12 is provided with respect to the vertical rotary shaft V-V and detects a rotation angle in the vertical direction of the telescope 2a.

The tracking light transmitting section 18 emits, as tracking light, an infrared laser, etc., with a wavelength different from that of distance measuring light. The reference sign 4 in FIG. 1 denotes an optical axis of tracking light. The design is made so that the optical axis 4 of the tracking light is on the horizontal rotary shaft H-H of the surveying instrument 2. The tracking light receiving section 19 is an image sensor, for example, a CCD sensor or a CMOS sensor. The tracking light receiving section 19 acquires a landscape image including the tracking light and a landscape image excluding the tracking light. Both of these images are transmitted to the arithmetic control section 17. In the arithmetic control section 17, a center of a target image is obtained from a difference between the both of these images, a position at which a deviation of the center of the target image from a center of a visual axis of the telescope 2a falls within a predetermined value is detected as a position of the target, and tracking is automatically performed so that the telescope 2a always faces a direction of the target. The tracking light transmitting section 18, the tracking light receiving section 19, and the arithmetic control section 17 are "tracking section."

The measurement section 20 includes a distance measuring light transmitting section and a distance measuring light receiving section, and emits a distance measuring light, for example, an infrared laser, etc., to a target and receives a light reflected on the target. Then, similarly to the tracking section, the measurement section 20 captures the target from a difference between an image including the distance measuring light and an image excluding the distance measuring light, and after collimating is completed, performs distance measuring and angle measuring to the target.

The scanner 22 is a so-called uniaxial laser scanner, and the reference sign 5 denotes an optical axis of the scanner 22 at a certain time, and the reference sign 10 denotes an irradiation point (measurement position) at this time. The scanner 22 irradiates a pulsed laser around a rotary shaft R-R as a single axis, detects reflected light of the pulsed laser, and performs distance measuring and angle measuring for each pulsed laser beam to acquire point group data.

The arithmetic control section 17 is a microcontroller including, for example, a CPU, a ROM, and a RAM, etc., mounted on an integrated circuit, and performs control of the rotation driving sections 13 and 14 and light emission control of the measurement section 20 and the tracking section, performs automatic tracking, automatic collimating, and distance measuring and angle measuring of a target, and acquires survey data. In addition, the arithmetic control section 17 performs rotation control and light emission control of the scanner 22, and acquires point group data of the irradiation point 10. The storage section 21 is, for example, a hard disk drive, saves programs for the arithmetic control described above, and stores acquired survey data and point group data.

Figure 3:
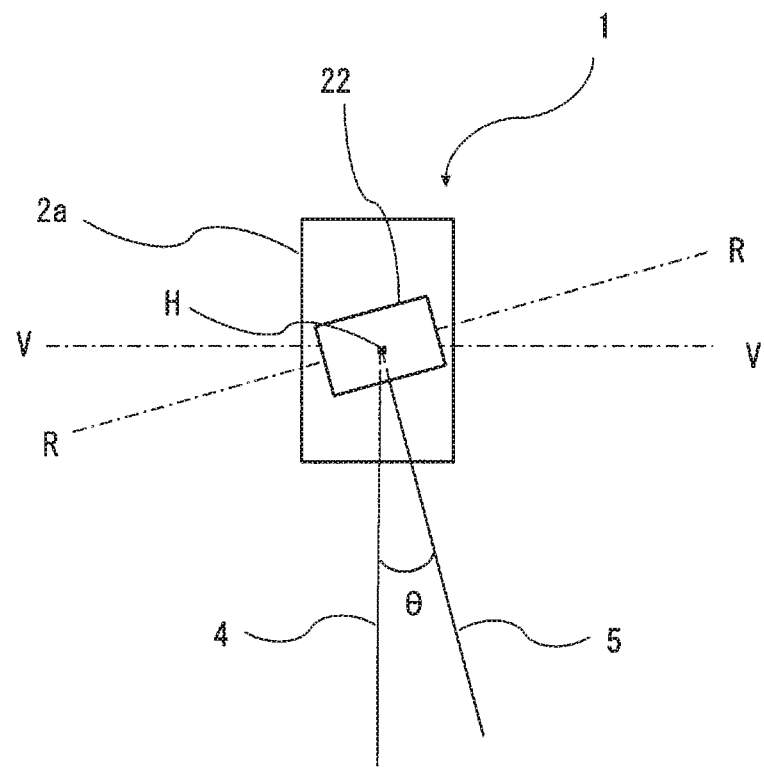
FIG. 3 is a plan view of the survey system according to the first embodiment.

The survey system 1 has the above-described elements, and the following disposition. In the survey system 1, as shown in FIG. 1, the scanner 22 is disposed so that the rotary shaft R-R extends in the horizontal direction and a scanning line SL in the vertical direction is obtained. Further, as shown in FIG. 3 as a plan view of the survey system 1, the scanner 22 is fixed to an upper portion of the telescope 2a so that an optical axis 5 of the scanner is on the horizontal rotary shaft H-H of the surveying instrument 2, and the optical axis 5 of the scanner is offset by a fixed angle θ in the horizontal direction from the optical axis 4 of the tracking light. The fixed angle θ is an angle at which the scanner 22 does not scan the prism 9, and is preferably set to a minimum value.

By using the survey system 1 described above, point group data can be acquired as follows.

First, with the survey system 1, a tracking program is executed. Thereafter, a survey program using the scanner 22 is also started. Then, the telescope 2a is controlled so as to always face the prism 9 by automatic tracking. The scanner 22 fixed to the telescope 2a also faces the prism 9 similarly to the telescope 2, however, the optical axis 5 of the scanner is offset by the fixed angle θ in the horizontal direction from the optical axis 4 of the tracking light, so that the scanning line SL does not match the prism 9, and is always controlled around the prism 9 (at a position at a distance from the prism 9). (The arrow in FIG. 1 shows movement of the scanning line SL along with movement of the prism 9.) Since the value of the fixed angle θ is known in advance, a three-dimensional position of the irradiation point 10 in a coordinate system of the surveying instrument 2 can be calculated from a rotation angle obtained by the horizontal angle detector 11 and the vertical angle detector 12 of the surveying instrument 2 and a measured distance value obtained by the scanner 22.

As described above, by using the survey system 1, without scanning the prism 9, the scanning line SL can be moved in accordance with movement of the prism 9. That is, the scanning line SL can be controlled around the target, so that even without setting a measurement area, data of a measuring object and the surrounding thereof can be acquired.

In addition, the following usage is also possible. By using the survey system 1, when it is desired to acquire point group data of a certain location, by reciprocating the target in this location, automatic tracking is performed, and even without setting a measurement area, point group data of the location can be acquired. That is, by moving the target at a location desired to be measured, a measurement area can be actively determined. At this time, by displaying the acquired point group data in real time on the display section 15 or a personal computer, etc., connected by wire or wirelessly, a survey can be performed while a scanning density is confirmed on the spot.

Second Embodiment

Figure 4:
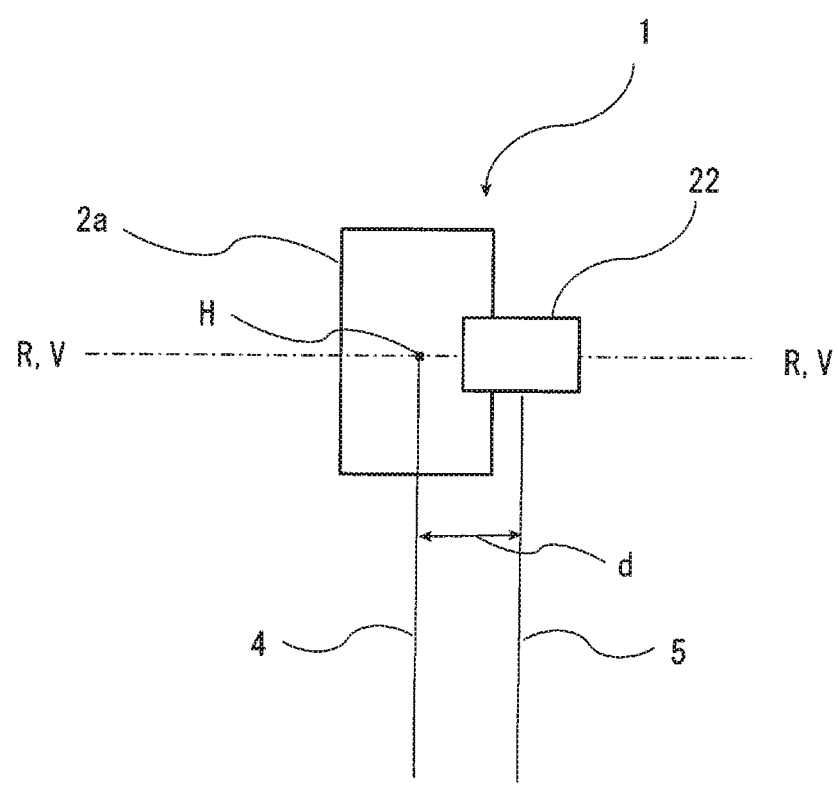
FIG. 4 is a plan view of a survey system according to a second embodiment.

FIG. 4 is a plan view of a survey system 1 according to a second embodiment. The same elements as in the first embodiment are designated by the same reference signs and description thereof is omitted. In the second embodiment, the optical axis 5 of the scanner and the optical axis 4 of tracking light are parallel to each other, and the optical axis 5 of the scanner is not on the horizontal rotary shaft H-H of the surveying instrument 2. Instead, the scanner 22 is fixed to an upper portion of the telescope 2a so that the optical axis 5 of the scanner is offset by a distance d in the horizontal direction from the optical axis 4 of the tracking light.

In the second embodiment, the scanner 22 is fixed to a position offset in the horizontal direction with respect to the telescope 2a (tracking section), therefore, the scanning line SL does not match the prism 9, and is always controlled around the prism 9 (controlled at a position at a distance from the prism 9). Since the value of the offset distance d is known in advance, a three-dimensional position of the irradiation point 10 in a coordinate system of the surveying instrument 2 can be calculated from a rotation angle obtained by the horizontal angle detector 11 and the vertical angle detector 12 of the surveying instrument 2 and a measured distance value obtained by the scanner 22. Therefore, as in the case of the first embodiment, even without setting a measurement area, data of a measuring object and the surrounding thereof can be acquired, and by moving the target in a location desired to be measured, a measurement area can be actively determined.

The position to which the scanner 22 is fixed is not limited to the position shown in the drawing, and may be any position or distance as long as the optical axis 5 of the scanner is offset in the horizontal direction from the optical axis 4 of the tracking light. The position to which the scanner is fixed may be a lower portion or a side portion of the telescope 2a, or a lower portion of the main body of the surveying instrument 2 (for example, lower portion of the display section 15) as long as the design of the surveying instrument 2 allows.

Third Embodiment

In a third embodiment, the optical axis 5 of the scanner is on the horizontal rotary shaft H-H of the surveying instrument 2 as shown in FIG. 3, and the fixed angle θ is an arbitrary angle including 0. The same elements as in the first embodiment are designated by the same reference signs, and description thereof is omitted.

Figure 5:
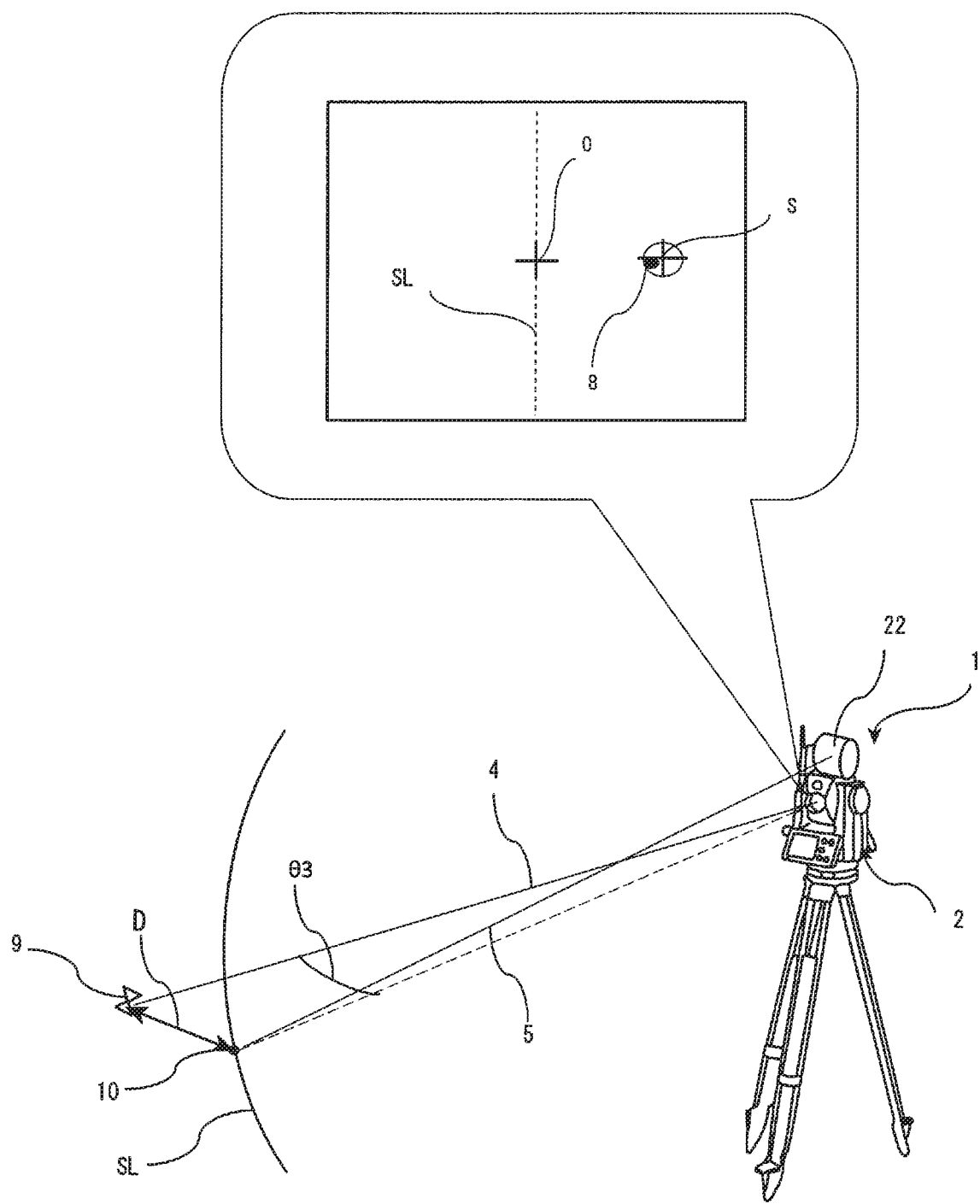
FIG. 5 is an external perspective view of a survey system according to a third embodiment, together with an image drawing acquired by the survey system.

FIG. 5 is a view of an image acquired by a survey system 1 according to the third embodiment. FIG. 5 shows an image acquired by the tracking light receiving section 19, and a reference sign 8 denotes an image of reflected light of tracking light. Different wavelengths are adopted for the scanner light and the tracking light, so that an image of the scanner is not projected on the tracking light receiving section 19. Therefore, in FIG. 5, scanner light is imaginarily shown as a scanning line SL although the scanner light is not projected in actuality. The reference sign O denotes an image center of the tracking light receiving section 19. In the third embodiment, control is performed so that the image 8 of reflected light of the tracking light is projected on a position S at a predetermined distance in the horizontal direction from the scanning line SL.

That is, in the third embodiment, a position at which the image 8 (center of the target image) of the reflected light of the tracking light falls within a predetermined value from the position S is detected as a target position, and tracking is performed. Then, according to a distance to the target, the position S of the tracking light receiving section 19 is varied, and by arbitrarily changing an angle θ3 between the optical axis 4 of the tracking light and the optical axis 5 of the scanner in actuality, the above-mentioned distance between the target (prism 9) and the irradiation point 10 in actuality can be always offset by a fixed distance D. The distance to the target can be obtained by, for example, a method in which (1) tracking is performed at the position of the image center O at the start of tracking, distance measuring is performed by the measurement section 20, a tracking position (position S) is determined according to an acquired value, and thereafter, the position S is not changed, (2) the image center O is tracked at the start of tracking, distance measuring is performed by the measurement section 20, and then, after the tracking position (position S) is changed, a size of the prism image according to the distance is measured to obtain the distance, and (3) the tracking position is sometimes returned to the image center O and distance measuring is performed during tracking. The dashed line in FIG. 5 is a line obtained by projecting the optical axis 5 of the scanner on the same plane as the optical axis 4 of the tracking light. Thus, even by displacing the tracking position on the tracking image sensor in the horizontal direction, the scanning line SL can always be controlled to a position offset by the fixed distance D with respect to the prism 9. Therefore, as in the case of the first embodiment, even without setting a measurement area, data of a measuring object and the surrounding thereof can be acquired, and by moving the target in a location desired to be measured, a measurement area can be actively determined. The tracking position is required to be separated at least in the horizontal direction and may be displaced in the vertical direction. That is, the tracking position on the tracking image sensor may be offset by a fixed angle from the detection position of the scanner.

Preferred modifications of the embodiments described above are described. The same elements as in the embodiments are designated by the same reference signs, and description thereof is omitted.

(Modification 1)

Figure 6:
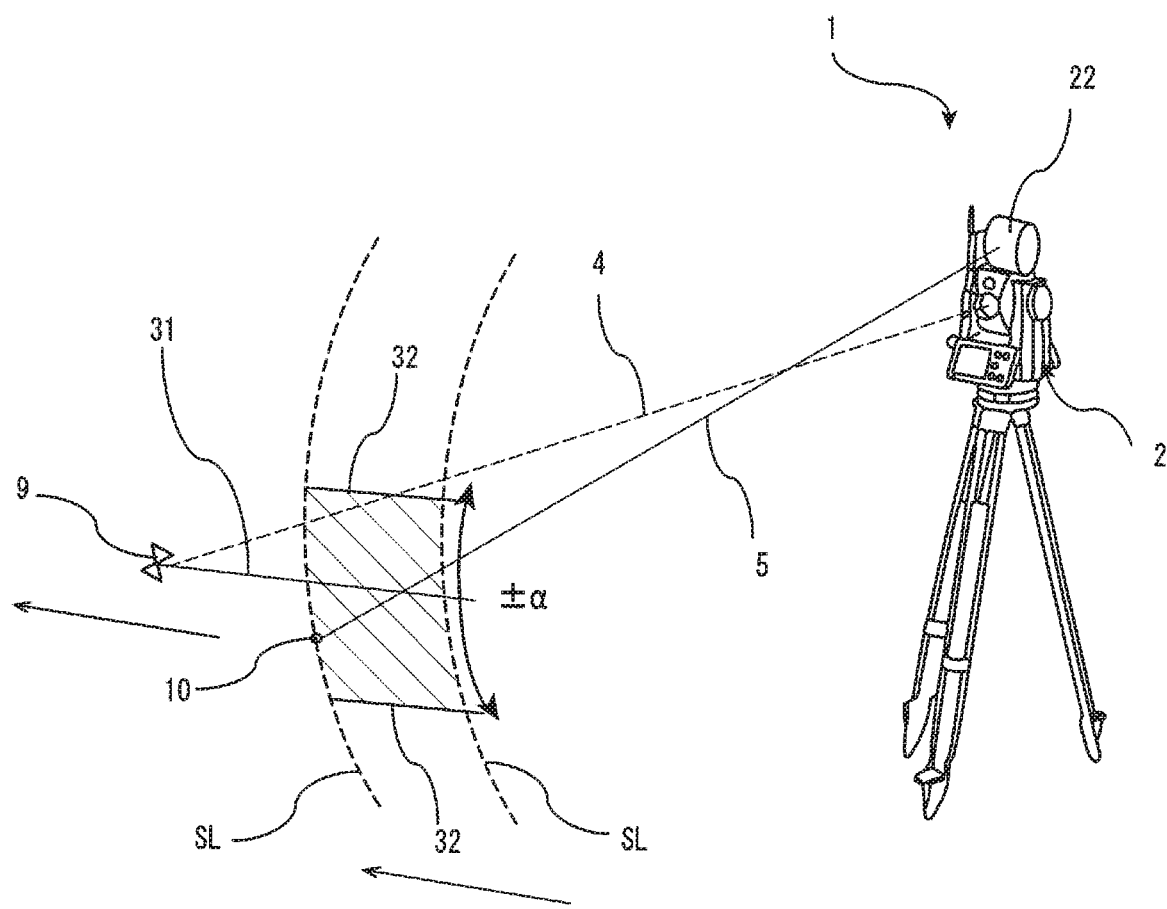
FIG. 6 is a view describing a modification 1 of the embodiments described above.

The surveying instrument 2 being a total station can measure an elevation angle of the prism 9 from a measured distance value and a measured angle value of the prism 9. Therefore, in a survey system 1 of Modification 1, point group data of other than an area extended by a predetermined angle upward and downward in the vertical direction around the elevation angle of the prism 9 is not saved in the storage section 21. FIG. 6 is a view describing Modification 1. The arrows in FIG. 6 show movements of the scanning line SL in accordance with movements of the prism 9. A reference sign 31 denotes a horizontal line of a position corresponding to the elevation angle of the prism 9, and the reference signs 32 denote horizontal lines extended by ±α (several to several tens of degrees) in the vertical direction from a horizontal line 31. That is, in Modification 1, point group data of a measurement area (shaded area in FIG. 6) surrounded by the locus of the scanning line SL and the extended horizontal lines 32 and 32 is saved, and point group data of other than this measurement area is not saved. Accordingly, the data volume to be saved can be reduced. The reference sign α that defines a range in the vertical direction of the measurement area may be an angle as described above, or may be set as a length, for example, ±1 m. In the case that α is set as a length, setting may be made so that the angle is automatically determined according to the distance.

(Modification 2)

In the survey system 1, a laser beam of the scanner 22 may be invisible light or visible light, and in the case of invisible light, there is a problem that an operator cannot identify the irradiation point 10. Therefore, a visible light line laser having an optical axis matching the optical axis 5 of the scanner in the horizontal direction is also preferably provided on, for example, a lower portion of the main body of the surveying instrument 2, so as to emit light as guide light. Accordingly, an operator can clearly identify the scanning direction.

(Modification 3)

In the survey system 1, the scanner 22 is scanned in the vertical direction, however, when a sampling position is fixed, even by repeating reciprocating scanning, there is a possibility that only point group data at positions at which the vertical angle is the same can be obtained. Therefore, it is also preferable to shift the scanning start point in increments of a minute angle. For example, at the time of turning back of reciprocating movement, by randomly delaying a laser beam emission timing of the scanner 22 or regularly delaying the timing in increments of, for example, 0.5 seconds, the sampling position (vertical angle) of scanning differs between upward scanning and downward scanning, so that more accurate and fine point group data can be obtained.

Embodiments and modifications of a preferred survey system of the present invention are described above, and each embodiment and each modification can be combined based on knowledge of a person skilled in the art, and such a combined embodiment is also included in the scope of the present invention.

LIST OF COMPONENTS

1 Survey system
2 Surveying instrument
2a Telescope
4 Optical axis of tracking light
5 Optical axis of scanner
7 Image of reflected light of tracking light
8 Image of reflected light of scanner
9 Prism (target)
10 Irradiation point
17 Arithmetic control section (tracking section)
18 Tracking light transmitting section (tracking section)
19 Tracking light receiving section (tracking section)
20 Measurement section
21 Storage section
22 Scanner
H-H line Horizontal rotary shaft of surveying instrument

The invention claimed is:

1. A survey system comprising:
a surveying instrument having a tracking section that tracks a target by emitting tracking light and receiving the tracking light reflected on the target; and
a scanner that rotates horizontally and integrally with the surveying instrument and performs scanning around a single axis in a vertical direction,
wherein an optical axis of the scanner is on a horizontal rotary shaft of the surveying instrument, and is offset by a fixed angle θ in the horizontal direction from an optical axis of the tracking light.

2. A survey system comprising:
a surveying instrument having a tracking section that tracks a target by emitting tracking light and receiving the tracking light reflected on the target; and
a scanner that rotates horizontally and integrally with the surveying instrument and performs scanning around a single axis in a vertical direction,
wherein an optical axis of the scanner is not on a horizontal rotary shaft of the surveying instrument, and is offset by a distance d in the horizontal direction with respect to an optical axis of the tracking section.

3. A survey system comprising:
a surveying instrument having a tracking section that tracks a target by emitting tracking light and receiving the tracking light reflected on the target; and
a scanner that rotates horizontally and integrally with the surveying instrument and performs scanning around a single axis in a vertical direction, wherein the scanner and the tracking section are offset in a horizontal direction,
wherein the surveying instrument further includes a measurement section that performs distance measuring and angle measuring to the target by emitting a distance measuring light and receiving the distance measuring light reflected on the target, an optical axis of the scanner is on a horizontal rotary shaft of the surveying instrument, the tracking section includes a tracking light transmitting section and a tracking light receiving section, performs tracking so that an image of reflected light of the tracking light is always at a predetermined position on an image of the tracking light receiving section, and detects an image of reflected light of the scanner at a position offset at least in the horizontal direction from the predetermined position on an image of the tracking light receiving section.

4. The survey system according to claim 1, wherein the survey system does not acquire anything except for point group data near an elevation angle of the measured target.

5. The survey system according to claim 2, wherein the survey system does not acquire anything except for point group data near an elevation angle of the measured target.

6. The survey system according to claim 3, wherein the survey system does not acquire anything except for point group data near an elevation angle of the measured target.

7. The survey system according to claim 2, wherein the tracking section includes a telescope that emits and receives a tracking light.

* * * * *